(12) United States Patent
Reimnitz (10) Patent No.: US 11,267,331 B2
(45) Date of Patent: Mar. 8, 2022

(54) HYBRID MODULE

(71) Applicant: Schaeffler Technologies AG & Co. KG, Herzogenaurach (DE)

(72) Inventor: Dirk Reimnitz, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 89 days.

(21) Appl. No.: 16/632,246

(22) PCT Filed: Jun. 29, 2018

(86) PCT No.: PCT/DE2018/100599
§ 371 (c)(1),
(2) Date: Jan. 17, 2020

(87) PCT Pub. No.: WO2019/015711
PCT Pub. Date: Jan. 24, 2019

(65) Prior Publication Data
US 2020/0171933 A1  Jun. 4, 2020

(30) Foreign Application Priority Data

Jul. 17, 2017 (DE) .......................... 102017116048.5
Dec. 18, 2017 (DE) .......................... 102017130271.9

(51) Int. Cl.
*B60K 6/387* (2007.10)
*F16D 21/08* (2006.01)
(Continued)

(52) U.S. Cl.
CPC ............... *B60K 6/387* (2013.01); *B60K 6/48* (2013.01); *F16D 13/385* (2013.01); *F16D 13/52* (2013.01);
(Continued)

(58) Field of Classification Search
CPC ......... B60K 6/00–547; F16D 25/00–14; F16D 13/00–76; F16D 21/08
See application file for complete search history.

(56) References Cited

U.S. PATENT DOCUMENTS 5,018,613 A * 5/1991 Nagano ................. F16D 13/757
192/70.252
2003/0066729 A1* 4/2003 Feldhaus ................ F16D 21/06
192/48.8
(Continued)

FOREIGN PATENT DOCUMENTS

DE 102011014099 A1 * 9/2011 ............. F16D 25/10
DE 102012206292 A1 11/2012
(Continued)

*Primary Examiner* — Ernesto A Suarez
*Assistant Examiner* — Lillian T Nguyen (57) ABSTRACT

A hybrid module for a powertrain of a motor vehicle includes an electric machine, a clutch device, and a frictionally-engaging separating clutch. The separating clutch is arranged between a dual-mass flywheel and an intermediate shaft. The separating clutch includes a counter-plate, an outer lamella carrier rigidly connected to the counter-plate, a pressure plate, axially movable relative to the outer lamella carrier, an intermediate plate, axially movable relative to the outer lamella carrier, a first clutch disk, axially movable and extending between the pressure plate and the intermediate plate, and a second clutch disk, axially movable and extending between the counter-plate and the intermediate plate. The pressure plate or the intermediate plate is connected to the outer lamella carrier for conjoint rotation therewith via a leaf spring, or the pressure plate or the intermediate plate is connected to the counter-plate for conjoint rotation therewith via a leaf spring.

14 Claims, 6 Drawing Sheets

(51) Int. Cl.
*F16D 13/70* (2006.01)
*B60K 6/48* (2007.10)
*F16D 13/38* (2006.01)
*F16D 13/52* (2006.01)

(52) U.S. Cl.
CPC ...... *F16D 21/08* (2013.01); *B60K 2006/4825* (2013.01); *F16D 13/70* (2013.01)

(56) References Cited

U.S. PATENT DOCUMENTS

| | | | |
|---|---|---|---|
| 2010/0133056 A1* | 6/2010 | McCutcheon | F16D 13/757 192/70.251 |
| 2011/0088989 A1* | 4/2011 | Agner | F16D 25/10 192/48.601 |
| 2015/0024903 A1* | 1/2015 | Jeong | F16D 21/08 477/5 |
| 2018/0202499 A1* | 7/2018 | Agner | B60K 6/405 |

FOREIGN PATENT DOCUMENTS

| | | | | |
|---|---|---|---|---|
| DE | 102015215153 A1 * | 2/2017 | ............ | F16D 21/06 |
| DE | 102016221948 A1 | 6/2017 | | |
| FR | 2803346 A1 | 7/2001 | | |
| WO | WO-2013135468 A1 * | 9/2013 | ............ | F16D 25/10 |
| WO | WO-2017008806 A1 * | 1/2017 | ............ | B60K 6/405 |
| WO | 2017092753 A1 | 6/2017 | | |

* cited by examiner

HYBRID MODULE

CROSS-REFERENCE TO RELATED APPLICATIONS

This application is the United States National Phase of PCT Appln. No. PCT/DE2018/100599 filed Jun. 29, 2018, which claims priority to German Application Nos. DE102017116048.5 filed Jul. 17, 2017 and DE102017130271.9 filed Dec. 18, 2017, the entire disclosures of which are incorporated by reference herein.

TECHNICAL FIELD

The disclosure relates to a hybrid module for a powertrain of a motor vehicle including an electric machine, a clutch device, and a separating clutch. The separating clutch is coupled, on the one hand, to a dual mass flywheel and, on the other hand, to an intermediate shaft. The separating clutch has a pack which can be brought into frictional engagement, including a pressure plate, a counter-plate, at least one intermediate plate and clutch disks that extend between the plates. The pressure plate, the intermediate plate, and the clutch disks can be moved axially.

BACKGROUND

As is known, a hybrid module of this kind installed in a powertrain of a motor vehicle is used to drive the vehicle either exclusively by means of an internal combustion engine that can be connected via the hybrid module, by means of an electric machine, i.e. an electric motor, or by means of both, or to recover energy by means of the electric machine when required and thus to charge the battery while driving or while the vehicle is stationary, for which purpose the electric machine operates in generator mode, then being driven by means of the internal combustion engine.

Thus, the hybrid module makes it possible to connect the combustion engine, i.e. the internal combustion engine, the electric machine or both into the powertrain in order to transmit torque, for which purpose various clutches are provided. The hybrid module itself is coupled on one side to the internal combustion engine, wherein the dual mass flywheel, i.e. a flywheel followed by a separating clutch, is provided on this side. When the separating clutch is closed, the torque generated by the internal combustion engine can be transmitted to an intermediate shaft, which is coupled to the separating clutch and is connected to the rotor of the electric machine for conjoint rotation therewith. The rotor of the electric machine, in turn, is connected via a clutch device, which can be a dry or wet single or dual or multiple clutch, to one or more output shafts leading to the transmission. By means of the separating clutch, it is thus possible to connect the internal combustion engine and to control whether and what torque is transmitted between the internal combustion engine and the electric machine or the rotor thereof. Via the rotor and the downstream clutch device, this torque can then be transmitted to the one or more output shafts. The torque generated by the internal combustion engine can be transmitted in both directions. When driving with power from the internal combustion engine and/or when charging the battery, for example, the internal combustion engine transmits a torque to the electric machine, while the electric machine transmits a torque to the internal combustion engine to start the internal combustion engine or to exploit the engine braking function, for example.

The torque is transmitted between the rotor of the electric machine and the transmission via the single, dual or multiple clutch, as described. If the vehicle is to drive in a purely electric mode, the separating clutch is opened and the internal combustion engine is not connected. The electric machine operates and the torque generated at the rotor is transmitted to the output shafts via the clutch device.

Simultaneous operation of both driving means is also conceivable, i.e. both the internal combustion engine and the electric machine are connected via the respective clutches, wherein the torque generated by the electric machine is superimposed on the torque generated by the engine.

In general, a hybrid module of this kind is embodied as a "P2 hybrid module", comprising a dry separating clutch, a wet double clutch, the corresponding clutch actuating systems, which therefore serve to open and close the respective clutch, and the electric machine, wherein the individual components are embodied and arranged in a manner which is as compact as possible. Thus, for example, the double clutch is integrated into the rotor, resulting in an axially short module. Despite the small available installation space, however, the separating clutch, usually referred to as K0, and the double clutch with its individual sub-clutches, usually referred to as K1 and K2, are two clutch assemblies that also operate individually and can therefore be actuated separately from one another. Often, full integration of the separating clutch into the double clutch is not adopted, despite the advantage in terms of installation space that can be achieved thereby, in order to enable the separating clutch and the double clutch to be used individually or to enable at least the main components of the clutches to be used for other purposes as well. For reasons of safety, the clutches are self-opening clutches.

In order to accommodate all the components in the available installation space, the individual clutches must be of small construction radially. All three clutches are therefore implemented in a multi-disk or lamellar construction comprising a plurality of individual disks or plates, thereby giving rise to at least four and usually more friction surfaces per clutch, which can be pressed together by the force of the respective actuating system connected to the clutch. These actuating systems are generally accommodated within the hybrid module housing and essentially comprise only the actuating or support bearings and cylinder-piston subassemblies, which are actuated by a pressure medium supplied by units outside the hybrid module housing. For this purpose, the pistons are moved in the cylinders and thus exert a force, which can be transmitted to the clutches via the actuating or support bearings. All three actuating systems can be controlled independently of one another, thus also enabling the three clutches to be actuated independently of one another. As a pressure medium, use is generally made of a hydraulic oil or a brake fluid, but pneumatic operation is also conceivable.

The clutches of the hybrid module can be operated wet or dry. Wet means that the friction surfaces of the clutches are cooled by a fluid and/or the friction conditions are influenced by a fluid. This requires corresponding sealing of the respective space in which the clutch is provided. It is conceivable, for example, to embody the separating clutch as a dry clutch and the clutch device, that is to say, for example, the double clutch, as a wet clutch, and to separate the two spaces from one another by means of a corresponding intermediate wall and a suitable seal. A reverse construction is also conceivable.

SUMMARY

According to the disclosure, a hybrid module of the type stated at the outset includes an outer lamella carrier which is rigidly connected to the counter-plate and relative to which the pressure plate and the intermediate plate can be moved axially. The pressure plate and/or the intermediate plate are connected to the outer lamella carrier or the counter-plate for conjoint rotation therewith via at least one leaf spring.

In the hybrid module according to the disclosure, the outer lamella carrier is, on the one hand, connected rigidly to the counter-plate. This can be accomplished by suitable fixing means, such as rivets or screws or one or more welded joints, for example. However, in contrast to the situation that was previously customary in the prior art, the outer lamella carrier preferably has no internal toothing, nor do the intermediate plate and/or the pressure plate have any external toothing, i.e. there is fundamentally no toothing engagement between the intermediate plate and/or the pressure plate and the outer lamella carrier. On the contrary, the connection for conjoint rotation between the intermediate plate and/or the pressure plate and the outer lamella carrier is here accomplished by one or more leaf springs, which is/are, on the one hand, fixed on the pressure plate and/or the intermediate plate and, on the other hand, is/are fixed on the outer lamella carrier. These leaf springs are assigned a dual function. On the one hand, they serve to transmit torque when a torque coming from the outer lamella carrier is introduced into the separating clutch. On the other hand, they also serve as spring elements, which enable the compressed pack to be opened again after the relief of the load on said pack, and enable the intermediate plate and the pressure plate to be pushed back into the initial situation under no load and thus enable the frictional engagement to be ended, i.e. enable the separating clutch to be opened again.

This has the effect, on the one hand, that the intermediate plate and/or the pressure plate can be embodied in a simpler way since there is no external toothing to be formed. The same applies to the outer lamella carrier, which does not have to have any internal toothing, or requires it only in a limited section, if, for example, only the pressure plate is connected via a leaf spring, and the intermediate plate is coupled by means of toothing engagement. Moreover, the configuration according to the disclosure allows axial movement of the plates along the outer lamella carrier with less friction since there is no toothing engagement causing friction.

In principle, there is the possibility of attaching only the pressure plate, only the intermediate plate or both plates in an appropriate manner via one or more leaf springs. If both are coupled to the outer lamella carrier in this way via one or more leaf springs, all the toothing engagements are eliminated. However, it is also conceivable to couple only the intermediate plate via toothing engagement and to attach the pressure plate via a leaf spring, for example. In this case, the intermediate plate should be provided with external toothing, but the outer lamella carrier requires only a relatively short internally toothed section since the pressure plate is not guided by toothing.

In addition, there is the possibility of providing the leaf spring coupling not with the outer lamella carrier but with the counter-plate. In this case, however, the principle of operation is the same since the counter-plate is connected rigidly to the outer lamella carrier.

In this case, the pressure plate and/or the intermediate plate can each be connected to the outer lamella carrier or the counter-plate via at least one leaf spring. Thus, at least two leaf springs are provided, wherein one connects the pressure plate to the outer lamella carrier or the counter-plate, and the other connects the intermediate plate to the outer lamella carrier or the counter-plate. As an alternative, it is conceivable for the pressure plate and the intermediate plate to be connected to the outer lamella carrier or the counter-plate via a common leaf spring. In this case, therefore, just one leaf spring is provided, which couples both plates to the outer lamella carrier or the counter-plate.

To fix the one or more leaf springs on the outer lamella carrier or the counter-plate, it is expedient if said carrier or carriers has/have an outward-extending radial flange or a plurality of radially outward-extending tabs, on which the one or more leaf springs are fixed or supported. This radial flange or the tabs thus form an axial fixing plane, in which the leaf spring(s) can be fixed. It is possible in principle to use corresponding fixing means, such as rivets or the like, for fixing, and attachment by spot welding or the like is also conceivable.

In principle, each leaf spring should be connected to the outer lamella carrier or the counter-plate and to the pressure plate or the intermediate plate via at least three fixing points.

To fix the or each leaf spring on the pressure plate and/or the intermediate plate, these too can have radially outward-extending web-type extensions, on which the leaf springs are fixed. These web-type extensions too form a corresponding axial fixing plane which allows simple fixing of the leaf springs, e.g. by means of rivets or the like.

If extensions of this kind are formed on the intermediate plate and/or the pressure plate, the outer lamella carrier is provided with axially extending apertures, in which at least the extensions of the intermediate plate but preferably also the extensions of the pressure plate engage. Since the two plates are moved axially relative to the fixed-location outer lamella carrier as the separating clutch is pressed together, the corresponding aperture geometry must be provided on the outer lamella carrier to prevent the web-type extensions running up against the outer lamella carrier. When viewed radially, the intermediate plate is usually situated within the ring- or pot-shaped outer lamella carrier in any case, and therefore the web-type extensions thereof reach through the apertures even in the open clutch position. In the initial position, the pressure plate can be axially in front of the outer lamella carrier and, during the axial movement, can be inserted by means of its extensions into the apertures on the outer lamella carrier.

As already described, it is conceivable not to connect both the intermediate plate and the pressure plate to the outer lamella carrier or the counter-plate via one or more leaf springs but to connect only one of these plates, while the other axially movable plate is guided by toothing, that is to say therefore has corresponding external toothing, by means of which it engages in the internal toothing of the outer lamella carrier. By this means, there is coupling which prevents relative rotation but which, as before, allows axial movement.

As described, a torque is introduced into the separating clutch via the outer lamella carrier by means of the dual mass flywheel coupled to the latter. In order to be able to transmit the torque from the dual mass flywheel to the outer lamella carrier in a simple manner, toothing engagement is preferably provided, i.e. internal toothing is provided on the dual mass flywheel, while the outer lamella carrier has external toothing, and these mesh. By this means, it is also possible to achieve an assembly that transmits a high torque.

It is expedient here if the dual mass flywheel has a radially-inward extending flange, on which the internal toothing is provided which engages in external toothing provided on the outer lamella carrier. This external toothing can be obtained by local forming of the outer lamella carrier in the region of coupling to the dual mass flywheel, for example, without the need to design it with internal or external toothing over its entire axial length since this is not required when both the intermediate plate and the pressure plate are coupled via the leaf springs. As an alternative, it is conceivable to provide a radial flange on the outer lamella carrier, for example, said flange having external toothing which engages in the internal toothing of the dual mass flywheel flange. This radial flange can be readily produced by corresponding forming on the outer lamella carrier, which is embodied as a sheet-metal component.

BRIEF DESCRIPTION OF THE DRAWINGS

The disclosure is explained in greater detail below by means of embodiment examples with reference to the drawings. The drawings are schematic illustrations and show, in FIG. 1 a diagrammatic illustration of a hybrid module in a first embodiment, FIG. 2 a diagrammatic illustration of a hybrid module in a second embodiment, FIG. 3 a diagrammatic illustration of a hybrid module in a third embodiment, FIG. 4 a diagrammatic illustration of a hybrid module in a fourth embodiment, FIG. 5 a diagrammatic illustration of a hybrid module in a fifth embodiment, and FIG. 6 a diagrammatic illustration of a hybrid module in a sixth embodiment.

DETAILED DESCRIPTION

Figure 1:
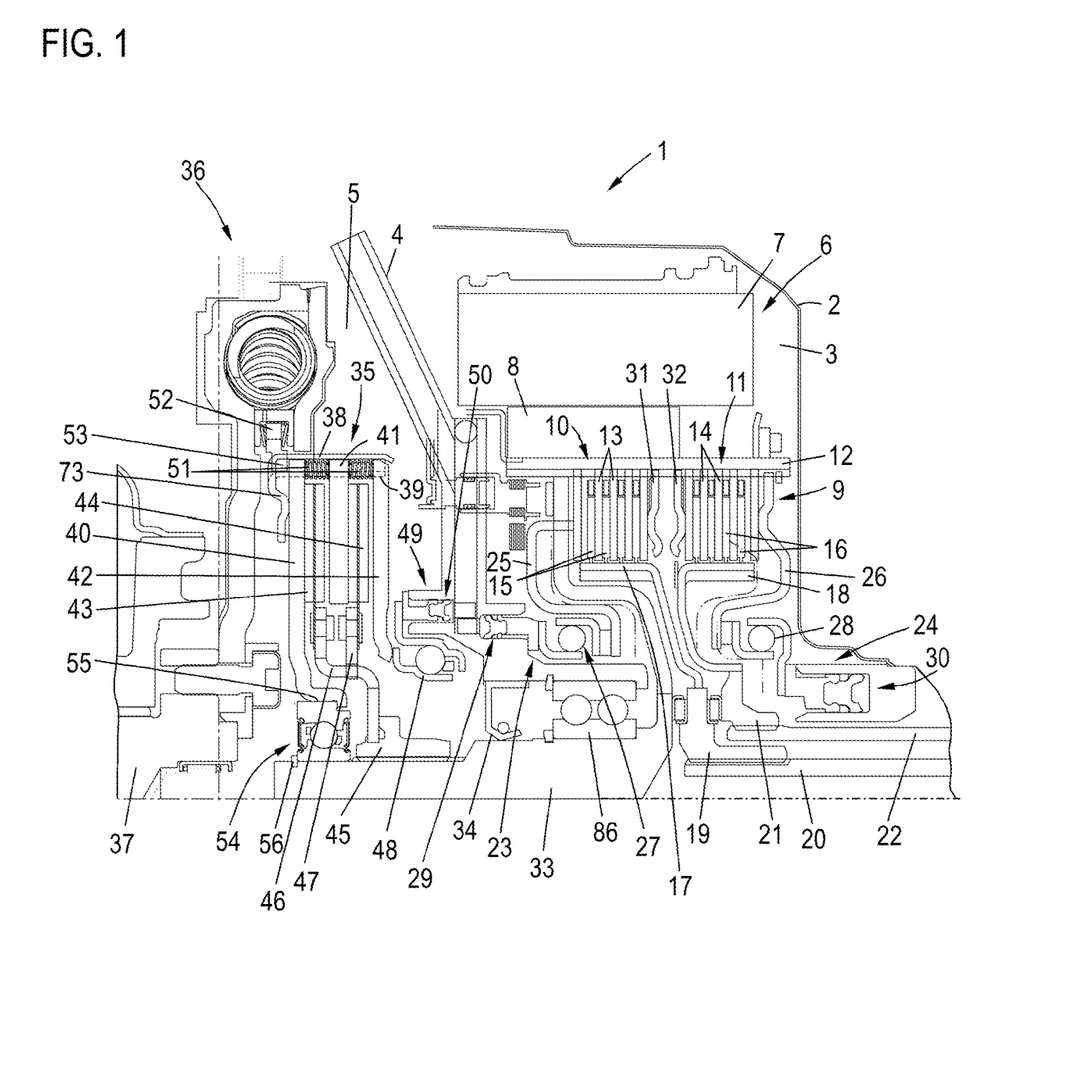

FIG. 1 shows a hybrid module 1 including a housing 2, merely indicated here, in which is provided a wet space 3 separated from a dry space 5 by a partition wall 4, wherein the intermediate wall 4 is, of course, appropriately closed or sealed off with respect to the housing 3. In the dry space 3 there is an electric machine 6 having a stator 7, a rotor 8 and a clutch device 9 comprising a first sub-clutch 10, usually referred to as K1, and a second sub-clutch 11, usually referred to as K2. The two sub-clutches 10, 11 have a common outer lamella carrier 12, which is rigidly connected to the rotor 8. First and second lamellae 13, 14 are guided in an axially movable manner on the outer lamella carrier 12 via corresponding toothing engagement, for which purpose the outer lamella carrier 12 has internal toothing and the lamellae 13, 14 have external toothing. Further lamellae 15, 16, which may also be referred to as inner lamellae, engage between the lamellae 13, 14, which may also be referred to as outer lamellae. The first inner lamellae 15 are guided in an axially movable manner on an inner lamella carrier 17, which has external toothing, in which the inner lamellae 15 engage by means of internal toothing. The second inner lamellae 16 engage by means of corresponding internal toothing in the external toothing of a second inner lamella carrier 18 and, there too, are guided in an axially movable manner. The first inner lamella carrier 17 is connected via a hub 19 to a first output shaft 20 leading to the transmission, and the second inner lamella carrier 18 is connected via a hub 21 to a second output shaft 22, likewise leading to the transmission.

To actuate the sub-clutches 10, 11, separate actuating systems 23, 24 are provided, which each have a pressure pot 25, 26, which is mounted for rotation relative to a fixed-location piston-cylinder arrangement 29, 30 by means of a corresponding bearing 27, 28. By means of the piston-cylinder arrangement 29, 30, the respective pressure pot 25, 26 can be moved axially. During this process, it compresses the corresponding lamella pack comprising the outer and inner lamellae 13, 15 and 14, 16, respectively, against a respective abutment 31, 32, by means of which the respective lamella pack is closed. When the lamella pack is closed, frictional engagement is formed within the individual sub-clutches 10, 11, with the result that a torque applied to the outer lamella carrier 12 can be transmitted to the respective inner lamella carrier 17, 18 and, from the latter, to the respective output shaft 20, 22.

The example shown in FIG. 1—and the situation is similar for all the following examples—is therefore a double clutch which is integrated into the electric machine 6.

The outer lamella carrier 12 is rigidly connected to an intermediate shaft 33, which is mounted by means of a bearing 86 in such a way that it does not rotate relative to the intermediate wall 4 or the housing assembly in general. The intermediate wall 4 is sealed off with respect to the intermediate shaft 33 by means of a corresponding sealing element 34. Coupled to the intermediate shaft 33 is a separating clutch 35, which, in turn, is coupled to a dual mass flywheel 36 that, for its part, is connected to a crankshaft flange 37.

The coupling shaft flange 37, for its part, is connected to the internal combustion engine and is therefore driven by the latter. The separating clutch 35, which may also be referred to as the K0 clutch, serves to couple the internal combustion engine when required in order to transmit a torque supplied by means of the internal combustion engine via the intermediate shaft 33 to the rotor 8 and thus to the outer lamella carrier 12, with the result that the torque can be transmitted selectively via the first or the second sub-clutch 10, 11 to the respectively coupled output shaft 20, 22.

The separating clutch 35 has an outer lamella carrier 38, which has axially extending internal toothing. This internal toothing simultaneously also forms external toothing, which likewise extends axially. The combined internal and external toothing is formed by the section 39 indicated by dashed lines.

Furthermore, the separating clutch 35 comprises a counter-plate 40, which is fixed in position when viewed axially and is rigidly connected in this region to the outer lamella carrier 38, which has a corresponding radial flange 73. This can be accomplished by riveted or welded joints, for example.

Also provided is an intermediate plate 41 and a pressure plate 42, which engage via corresponding external toothing systems in the internal toothing of the outer lamella carrier 38 and, by this means, are guided in a manner which prevents relative rotation but allows axial movement. Respective clutch disks 43, 44, which are both connected to the intermediate shaft 33 for conjoint rotation therewith via a corresponding hub 45, engage between the counter-plate 40 and the intermediate plate 41 and between the intermediate plate 41 and the pressure plate 42. Clutch disk 43 is connected to the hub 45 via a bent connecting flange 46, and clutch disk 44 is connected to the connecting flange 46 via a driver disk 47. Since the clutch disks 43, 44 must be axially movable, the hub 45 is guided in an axially movable manner on the intermediate shaft 33, which is externally toothed and to which the hub 45 is connected for conjoint rotation therewith by corresponding internal toothing.

The pressure plate 42 is mounted for rotation relative to the intermediate wall 4 by means of a bearing 48. The bearing 48, in turn, is part of an actuating system 49, which likewise comprises a piston-cylinder unit 50 that, like the other piston-cylinder units already described, can be actuated hydraulically or pneumatically. By means of the movable piston, the bearing 48 and, with it, the pressure plate 42 can be moved axially, with the result that said plate is moved axially in translation and, at the same time, takes the clutch disks 43, 44 and the intermediate plate 41 along axially and thus brings this lamella pack into frictional engagement. This translational movement takes place against the restoring force of a plurality of spring elements 51, which are arranged between the counter-plate 40 and the intermediate plate 41 and between the intermediate plate 41 and the pressure plate 42 in the region of the internal toothing of the outer lamella carrier 38. It is possible for a plurality of separate individual spring elements 51, but also corresponding spring packs coupled into a ring shape, to be positioned in a manner distributed around the respective circumference.

For coupling the dual mass flywheel 36, said flywheel has a radial flange 52, which has internal toothing 53, which meshes with the external toothing of the outer lamella carrier 38, i.e. engages in said toothing. Consequently, it is possible by this means to transmit a torque, which has been transmitted from the internal combustion engine to the dual mass flywheel 36 via the coupling shaft flange 37, from the dual mass flywheel 36 to the outer lamella carrier 38 and, via the latter or the separating clutch 35 itself, to the intermediate shaft 33 and, from the latter, via the double clutch to the corresponding output shaft 20, 22. The central subassembly is the separating clutch 35 and the coupling thereof to the dual mass flywheel. For torque transmission, each of the clutch disks 43, 44 can be clamped frictionally between their neighboring components, i.e. the respective plates 40, 41, 42, when the actuating system 49 is actuated. The two clutch disks 43, 44 can be moved axially but are connected to the intermediate shaft 33 for conjoint rotation therewith. The axially fixed counter-plate 40, the intermediate plate 41 capable of limited axial movement and the pressure plate 42 capable of limited axial movement are connected to the dual mass flywheel 36 for conjoint rotation therewith. In order to close the separating clutch 35 and to transmit torque, the actuating system 49 connected to the separating clutch 35 pushes the pressure plate 42 against the first clutch disk 44. The first clutch disk 44 then comes to rest against the intermediate plate 41, with the result that the pressure plate 42, the clutch disk 44 and the intermediate plate 41 are then moved axially until the intermediate plate 41 strikes the further clutch disk 43 and presses the latter against the axially fixed counter-plate 40. The greater the force exerted on the separating clutch 35 by the actuating system 49, the more strongly the friction surfaces between the plates or disks are pressed together and the greater is the torque that can be transmitted in the separating clutch.

To ensure that the actuating forces are not transmitted to the crankshaft of the internal combustion engine, the counter bearing plate 40 is supported via a bearing 54 on the intermediate shaft 33. This bearing 54 introduces the axial actuating forces into the intermediate shaft 33 but also ensures the centering, support and positioning of the separating clutch 35. This bearing 54 is expediently embodied as an angular contact ball bearing or deep groove ball bearing. In the embodiment example shown, the bearing 54 is press fitted into a bearing seat 55, which is formed on the counter-plate 40 and ensures radial and axial positive engagement. When the separating clutch 35 is mounted on the intermediate shaft 33, the bearing 54 is pushed onto the intermediate shaft 33 and then secured against unwanted axial displacement. In the embodiment example shown, this is accomplished by means of a shaft retention ring 56, which is inserted into a corresponding groove on the intermediate shaft 33. As an alternative, it is also possible to insert further components between the counter bearing plate 40 and the bearing 54 and/or between the bearing 54 and the intermediate shaft 33. In order to increase the loadbearing capacity of the bearing 54 which supports the separating clutch 35 on the intermediate shaft 33, it may be worthwhile to select a significantly larger bearing diameter than the diameter of the intermediate shaft 33. It is then particularly expedient to arrange a part, in the form of a sleeve for example, between the bearing 54 and the intermediate shaft 33, said part compensating the radial distance between the two components and ensuring axial and radial force transmission and positioning.

The counter-plate 40, the intermediate plate 41 (of which it is, of course, also possible to provide several, which then has the effect that a plurality of clutch disks have also to be provided) and the pressure plate 42 are connected to one another by the outer lamella carrier 38. As described, this is rigidly connected to the counter-plate 40, e.g. by welding or riveting. The intermediate plate 41 and the pressure plate 42 can be moved axially relative to the outer lamella carrier 38 but are held in positive engagement radially and in the circumferential direction by the latter. The outer lamella carrier 38 thus ensures that the intermediate plate 41 and the pressure plate 42 remain within the desired range of motion thereof. In addition, the outer lamella carrier ensures torque transmission between the pressure plate 42, the intermediate plate 41, the counter-plate 40 and the dual mass flywheel 36. As described, it is expediently equipped with a toothed contour, the combined internal and external toothing described, extending in the axial direction and repeating itself in the circumferential direction. Engaging in this toothed contour in the embodiment example described are the pressure plate 42, the intermediate plate 41, possibly also the counter-plate 40 and the radial flange 52 of the dual mass flywheel, each by means of respective toothed contours.

In order to promote the reliable opening of the separating clutch 35 after the removal of the load on the part of the actuating system 49, the spring elements 51, in this case helical compression springs, are provided between the counter-plate 40 and the intermediate plate 41 and between the intermediate plate 41 and the pressure plate 42 in this embodiment example. These spring elements 51 push the intermediate plate 41 and the pressure plate 42 back into their open position when the pressure of the pressure medium in the piston-cylinder unit 50 has fallen sufficiently. During this process, the spring elements 51 also push the piston of the piston-cylinder unit 50 back into its initial position. The separating clutch 35 can be equipped with encircling spring elements 51 or with a plurality of spring elements 51 arranged around the circumference, wherein the spring elements 51 are here held in position by the participating plates and/or the lamella carrier 38.

For the assembly of the internal combustion engine and the transmission, the assembly interface is here situated between these two units, more specifically between the dual mass flywheel 36 and the separating clutch 35. The dual mass flywheel 36 is screwed to the crankshaft flange 37 and is thus part of the internal combustion engine as regards the assembly sequence. The separating clutch 35 is fixed on the intermediate shaft 33, which is mounted on the supporting wall 4 connected to the housing 2. As a result, the separating clutch 35 is part of the transmission as regards the assembly sequence. During the fitting together of the internal combustion engine and the transmission during assembly, a splined joint comprising the toothing 53 of the dual mass flywheel 36 and the external toothing of the outer lamella carrier 38 of the separating clutch 35 is also joined together. Via these toothed contours—or axially joinable connecting geometries embodied in some other way—the torque is transmitted between the dual mass flywheel 36 and the separating clutch 35 after assembly. In order to keep the space requirement for this splined or toothed joint as small as possible, the radial flange 52 is provided in the embodiment example shown with internal toothing, which engages in the toothed outer contour, i.e. the external toothing, of the lamella carrier 38, wherein, as FIG. 1 shows, sub-clutch 35 is inserted at least partially into the dual mass flywheel 36 for this purpose. In order to avoid unwanted rattling noises within this splined or toothed joint between the dual mass flywheel 36 and the separating clutch 35, the splined or toothed joint can be preloaded in the circumferential direction. A preloading possibility of this kind is described below with reference to FIG. 4. In principle, a bracing component that can be rotated relative to the lamella carrier 38 can be used for this purpose, said bracing component engaging radially on the outside in the region of the splined or toothed joint and being braced in the circumferential direction by tangentially acting springs. The toothing 53 of the radial flange 52 can thus be clamped between the tooth flanks of the external toothing of the outer lamella carrier 38, against which the teeth of the toothing 53 come to rest in one circumferential direction, and the fingers or extensions of the bracing component, which engage in this region and press the flange toothing 53 against the just mentioned flanks of the outer lamella carrier 38. During the assembly of the internal combustion engine and the transmission, the toothing 53 of the radial flange 52 is inserted between or into the mating contours of the outer lamella carrier 38 and the bracing component.

The two clutch disks 43, 44 of the separating clutch 35 can be moved to a limited extent axially relative to one another, i.e. relative to the intermediate shaft 33, as described. However, they are not rotatable relative to one another or relative to the intermediate shaft 33. In the example shown in FIG. 1, the clutch disk 43 is fixed on the externally toothed intermediate shaft 33 by means of an internally toothed hub 45. The further clutch disk 44 is connected to the clutch disk 43 or the connecting flange 46 by internal toothing or by inward-projecting extensions having a toothed contour or web-type connecting contours.

In FIGS. 2-6 described below, the fundamental construction of the hybrid module, both as regards the integration of the electric machine 6 as well as the integration, construction and functioning of the clutch device 9 and the corresponding coupling of the dual mass flywheel 36 to the internal combustion engine etc., is the same as described above in relation to FIG. 1, and therefore attention is drawn to the statements relating thereto. However, the construction and operation of the respective separating clutch 35 and the coupling thereof to the dual mass flywheel 36 is different in each case. For this reason, only this part of the respective hybrid module 1 is described with reference to the following figures, wherein as far as possible the same reference signs are used for the same components.

Figure 2:
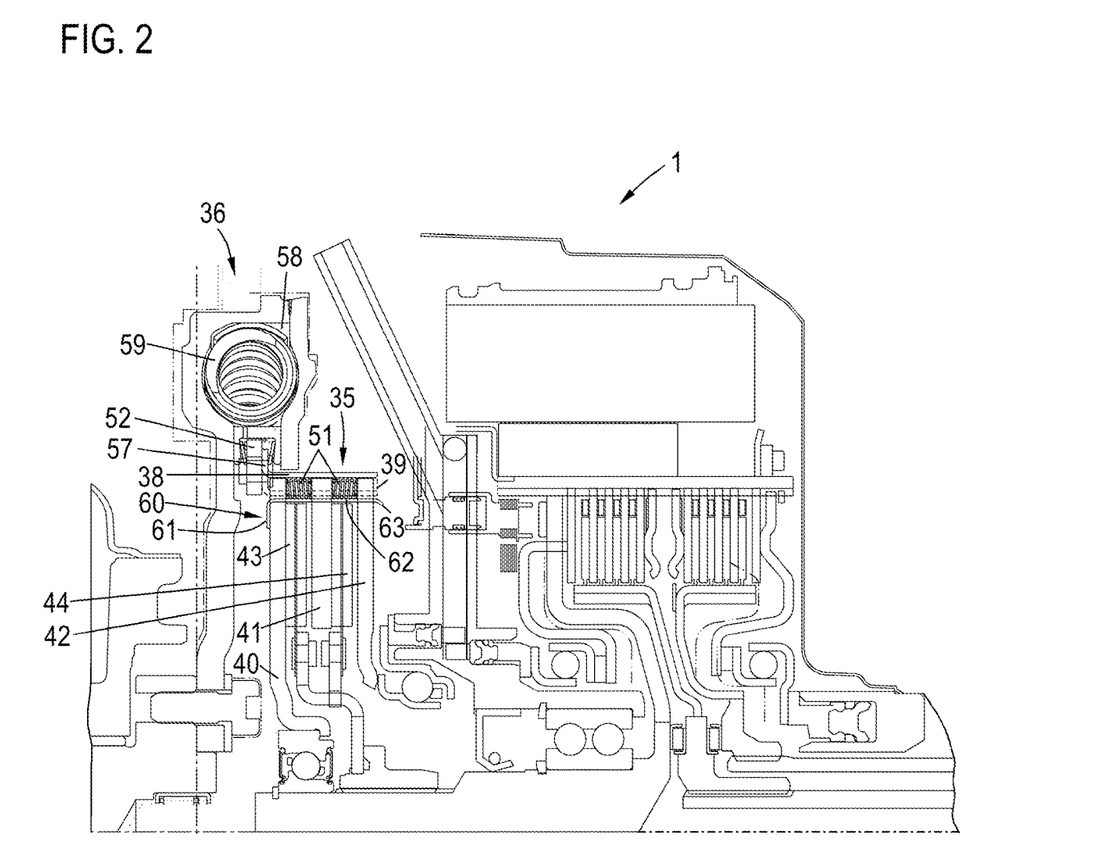

In the embodiment example of the separating clutch 35 which is illustrated in FIG. 2, the construction of the separating clutch is fundamentally comparable with the construction as described in FIG. 1. However, the fixing of the outer lamella carrier 38 is different here, as is the way in which the possibility of integrating an alignment element is implemented.

In the embodiment example shown in FIG. 2, the lamella carrier 38, which in this case too has internal toothing or combined internal and external toothing, indicated by the section 39 shown in dashed lines, is rigidly connected to a radial flange 52 of the dual mass flywheel. Here too, the outer lamella carrier 38 connects the lamellae of the separating clutch 35, i.e. the counter-plate 40, the intermediate plate 41 and the pressure plate 42, to one another for conjoint rotation, said plates in this case too engaging by means of corresponding external toothing systems in the internal toothing of the outer lamella carrier 38. Unlike the example described above, the counter-plate 40 in this case necessarily engages by means of external toothing in the internal toothing of the outer lamella carrier 38 after the latter has been rigidly or permanently coupled to the dual mass flywheel 36. That is to say that the entire lamella assembly can be detached from the outer lamella carrier 38 and therefore in this case the assembly interface is provided between the outer lamella carrier 38 and the lamella pack.

To fix the outer lamella carrier 38 on the radial flange 52, a radially outward-extending flange 57 is provided or integrally formed on that side of the toothed annular body of the outer lamella carrier 38 which faces the dual mass flywheel 36. This flange 57 is riveted or welded to the radial flange 52. In order to be able to arrange the separating clutch 35 axially as close as possible to the primary side of the dual mass flywheel 36 and radially as close as possible to the arc spring channel 58, in which the arc springs 59 are accommodated and guided, the connection between the flange 57 and the radial flange 52 is arranged completely or partially between the spring-loaded friction elements of the dual mass flywheel 36. The following geometric conditions are thus obtained at least for one friction element. The outer flange diameter of the flange 57 of the outer lamella carrier 38 is thus larger than the inside diameter of the friction element. However, the inside diameter of the friction element is larger than the outside diameter of the toothed annular body of the lamella carrier 38. In this arrangement, the diaphragm spring, which presses the friction element against its friction partner, e.g. the cover of the dual mass flywheel, can be supported on the outer lamella carrier 38 or on the connecting means, e.g. a rivet, by means of which the outer lamella carrier 38 is fixed on the radial flange 52.

Since the outer lamella carrier 38 is rigidly connected to the dual mass flywheel 36, the assembly interface between the internal combustion engine and the transmission extends between the outer lamella carrier 38, which is here part of the internal combustion engine, and the remaining parts of the separating clutch, that is to say essentially the counter-plate 40, the intermediate plate 41 and the pressure plate 42, which are part of the transmission. To enable the toothed contour, i.e. the internal toothing of the outer lamella carrier 38, to be inserted into the external toothing systems or toothed contours of the counter-plate 40, the intermediate plate 41 and the pressure plate 42 during the assembly of the internal combustion engine to the transmission, an alignment element 60, which holds the toothed contours of the three toothed plates 40, 41, 42 of the separating clutch 35 in the correct circumferential position, is provided in the example shown. This ensures that all three toothed contours of the plates 40, 41, 42, into which the external toothing of the outer lamella carrier 38 must be inserted, are in axial alignment with one another. The alignment element 60 not only ensures that the plates 40, 41, 42 cannot rotate relative to one another but also that the components of the separating clutch 35, including the clutch disks 43, 44 and the components connecting them to the intermediate shaft 33 form a stable subassembly, i.e. a stable constructional unit, even without the outer lamella carrier 38. The alignment element 60 thus also serves as a retention device during the transportation of or as a safeguard against loss of the separating clutch 35. In particular, the counter-plate 40, the intermediate plate 41, the pressure plate 42 and the two clutch disks 43, 44 are held together by the alignment element 60. The spring elements 51 which push the plates 40, 41, 42 of the separating clutch 35 back into the open position are fixed on the plates or, alternatively, held in that position by the alignment element, of which of course it is also possible to provide a plurality distributed around the circumference.

In the embodiment example shown in FIG. 2, the alignment element 60 is provided as an annular component, which is fixed on the counter-plate 40 by means of a radial flange 61 and which has axially extending elongate finger-type extensions 62, which extend through the tooth gaps of the separating clutch plates 40, 41, 42 as far as the rear side of the pressure plate 42. Behind the pressure plate 42, the extensions 62 are bent over and therefore have an edge 63 which is bent radially inward and engages behind the pressure plate 42. This bending over takes place when all the components, including the pressure plate 42, have been inserted into the alignment element 60. This rear engagement ensures that the components can no longer fall out. The alignment element 60 thus forms a kind of substitute lamella carrier, which performs all the functions of the outer lamella carrier 38, which is not yet present, from the assembly of the separating clutch, that is to say when the separating clutch is assembled as a subassembly, to the assembly of the internal combustion engine with the transmission. Since the extensions 60 of the alignment element extend close to the root circle in the tooth gaps of the toothing systems of the plates 40, 41, 42, the alignment element 60 does not cover the main part of the tooth flanks of the plates 40, 41, 42. When the outer lamella carrier 38 is inserted into the tooth gaps of the plates 40, 41, 42, the tooth flanks of the plates 40, 41, 42 can thus come to rest directly against the tooth flanks of the internal toothing of the outer lamella carrier 38. This is also made possible by the fact that the plates 40, 41, 42 preferably have somewhat more play in the circumferential direction in the alignment element 60 than in the external toothing of the lamella carrier 38. This ensures that the torque transmission from the plates 40, 41, 42 takes place directly to the outer lamella carrier 38 without the need for the alignment element 60 to transmit circumferential forces during the operation of the separating clutch 35. As regards the alignment and guidance of the plates, the alignment element 60 thus no longer has a role during the operation of the separating clutch 35. It therefore also does not hinder the axial movement of the plates 40, 41, 42 or of the clutch disks 43, 44. If, as is possible, the spring elements 51 installed in the separating clutch 35 are positioned by means of the alignment element 60, the alignment element 60 can perform this function over the entire life of the clutch.

The alignment element 60 may be embodied as a sheet-metal part, i.e. as a simple punched and deep drawn component. As an alternative to an annular alignment element 60, it is also possible to use a plurality of separate alignment elements arranged around the circumference. On the side of the counter-plate 40 facing the internal combustion engine, the alignment element 60 can also have one or more contour elements or insertion contours which facilitate the insertion of the external toothing of the outer lamella carrier 38 into the tooth gaps of the counter-bearing plate 40 and therefore also the axially aligned toothing systems of the intermediate plate 41 and of the pressure plate 42. These insertion contours can be chamfered surfaces, in particular surfaces chamfered in the radial and/or tangential direction, which are arranged around the tooth gaps of the counter-plate toothing. These surfaces act as it were as a funnel with the function of enabling the external toothing of the outer lamella carrier 38, which approaches the separating clutch 35 in an axial direction of movement but is not precisely aligned with the tooth gaps, to slide along the oblique surfaces until the teeth of the external toothing of the outer lamella carrier 38 are in front of the tooth gaps of the counter-plate 40 and can thus be inserted axially into the separating clutch 35.

As an alternative to the embodiment example embodied in FIG. 2, it is conceivable, in addition to the outer lamella carrier 38, to provide an annular connecting support, which is connected to the outer lamella carrier for conjoint rotation therewith but is detachable. In this case, the connecting support provided with internal toothing would have to be fixed rigidly on the radial flange 52 of the dual mass flywheel 36, in a manner similar to the outer lamella carrier 38 shown in FIG. 3. In this alternative embodiment, however, the outer lamella carrier 38 would then be part of the separating clutch 35, as described in FIG. 1, and would be rigidly connected to the counter-bearing plate 40. In the context of assembly, the connecting support rigidly connected to the dual mass flywheel would then (as in FIG. 2) have to be inserted axially into the external toothing of the outer lamella carrier 38, which is arranged rigidly on the counter-plate 40 of the separating clutch 35, as in FIG. 1. The connecting support rigidly connected to the dual mass flywheel 36 then transmits the torque of the engine to the outer lamella carrier 38 rigidly connected to the counter-plate 40, the outer lamella carrier then transmitting the torque to the plates 40, 41, 42 of the separating clutch 35.

Like the outer lamella carrier 38, the connecting support has an approximately round region which has an axially extending toothed contour repeated in the circumferential direction radially on the inside and radially on the outside. Like the outer lamella carrier 38, the connecting support can be embodied as a sheet-metal part, the material thickness of which in the region of the toothing is small in relation to the size of the teeth, as in the case of the outer lamella carrier 38. As a result, the material follows a meandering shape in the circumferential direction in order to be able to form the combined internal and external toothing. Here too—as in the case of all the embodiment examples described—it is the case that fundamentally all the components serving for frictional engagement within the separating clutch 35, i.e. the plates 40, 41, 42 and the clutch disks 43, 44, can be referred to as "lamellae". As an alternative, the separating clutch 35 can also be embodied with more than the four friction surfaces or friction planes shown here if, as already described, a plurality of intermediate plates 41 and additional clutch disks are integrated, as is the case with the sub-clutches 10, 11 of the clutch device 9.

Figure 3:
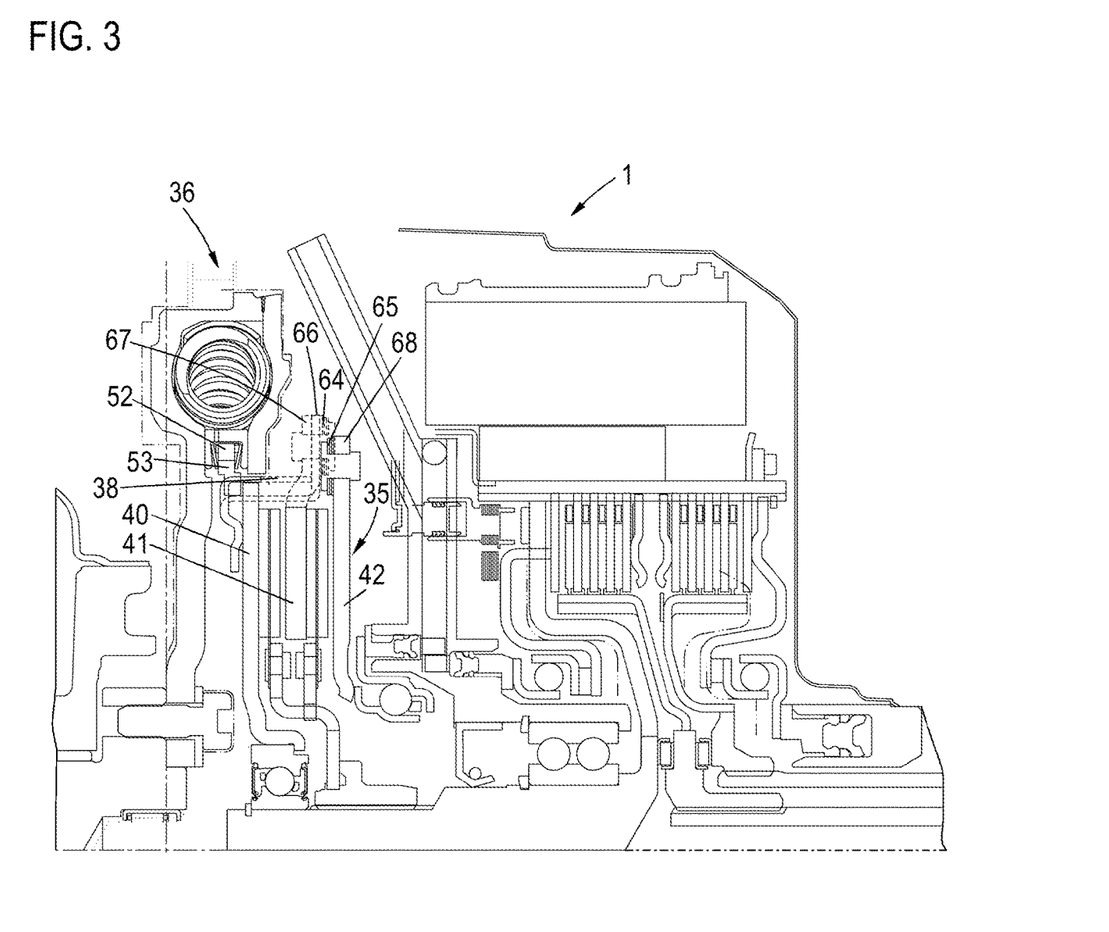

The embodiment example shown in FIG. 3 is similar to that in FIG. 1. That is to say that, here too, the outer lamella carrier 38 is rigidly connected to the counter-plate 40 of the separating clutch 35. The outer toothing of the outer lamella carrier 38 forms the assembly interface and torque transmission interface with the radial flange 52 of the dual mass flywheel 36, wherein, here too, the radial flange 52 engages by means of internal toothing 53 in the external toothing of the outer lamella carrier 38. The embodiment of the separating clutch 35 which is shown in FIG. 3 is distinguished by the fact that, in addition to the outer lamella carrier 38 which is rigidly connected to the counter-plate 40 and relative to which the pressure plate 42 and the intermediate plate 41 can be moved axially, the pressure plate 42 and/or the intermediate plate 41 are connected to the outer lamella carrier 38 or the counter-plate 40 for conjoint rotation therewith via at least one leaf spring. In the example shown in FIG. 3, both the intermediate plate 41 and the pressure plate 42 are connected to the outer lamella carrier 38 via corresponding leaf springs 64 (as regards the intermediate plate 41) and 65 (as regards the pressure plate 42). For this purpose, the outer lamella carrier 38 has an encircling, radially outward-extending radial flange 66 on its side facing the transmission. As an alternative, the outer lamella carrier 38 can also have a plurality of radially outward-extending tabs distributed around the circumference on its side facing the transmission. This radial flange 66 or the tabs are used to fix the leaf springs 64, 65 which support the intermediate plate 41 and the pressure plate 42. It is expedient if both the intermediate plate 41 and the pressure plate 42 are held by means of the leaf springs 64, 65 at three points distributed over the circumference. In this case, the leaf springs center the respective plates 41, 42, ensure torque transmission and allow the axial movement of the plates.

It is possible to connect the intermediate plate 41 and the pressure plate 42 to the outer lamella carrier 38 via respective separate leaf springs 64, 65, as shown in FIG. 3. As an alternative or in addition, it is also possible to employ leaf springs which are connected to the lamella carrier 38, the intermediate plate 41 and the pressure plate 42, that is to say which jointly couple the three components.

A plurality of extensions 67 (on the intermediate plate 41) and 68 (on the pressure plate 42), which are distributed around the circumference and on which the leaf springs 64, 65 are fixed, is likewise provided radially on the intermediate plate 41 and the pressure plate 42. To ensure that these extensions 67 do not collide with the lamella carrier 38, said carrier has axially extending apertures, i.e. is provided locally with longitudinal slots, to ensure that the extensions at least of the intermediate plate 41 and, where applicable, also the extensions of the pressure plate 42, can be introduced into these apertures or slots when the lamella pack is compressed axially. The side of the outer lamella carrier 38 on which the leaf springs 64, 65 are fixed thus has the same purpose as a clutch cover in the majority of commercially available clutches. The lamella carrier shown in FIG. 3 can thus also be replaced by a driver ring and a clutch cover which perform the lamella carrier function. The driver ring serves as a connection interface with the dual mass flywheel, and the clutch cover supports the leaf springs which hold the plates of the separating clutch.

As an alternative, there is also the possibility for the counter-plate 40 to have radially outer extensions on which the leaf springs are fixed. For this purpose, the counter-plate 40 can be provided with a collar which extends radially over the clutch disk 43 arranged adjacent to it, in the direction of the transmission, and which is adjoined in the radial direction by an encircling radial flange or by a plurality of radially extending tabs for fixing the leaf springs.

The intermediate plate 41 and pressure plate 42 fixed by means of the leaf springs 64, 65 can be moved with less friction than is the case with plates 41, 42 mounted in lamella carrier toothing. This is because, by virtue of the torque-transmitting rigid connection of the plates 41, 42 to the outer lamella carrier 38 via the leaf springs 64, 65, there is no friction-generating toothing engagement, i.e. the elements can be moved axially relative to one another without making contact. As a result, the separating clutch 35 with plates 41, 42 fixed on the leaf springs 64, 65 can be controlled and actuated in a particularly effective manner. Moreover, there is no risk that high circumferential accelerations or unfavorable resonance effects will lead to rattling noises, as may occur with lamella toothing systems.

As an alternative to the example shown in FIG. 3, it is also possible for just some of the axially movable plates installed in the separating clutch 35, in this case the intermediate plate 41 and the pressure plate 42, to be guided in lamella carrier toothing and for the others to be fixed by means of leaf springs. With reference to FIG. 3, it would be possible, for example, for the intermediate plate 41 to be guided in the lamella carrier toothing, as already described by way of example with reference to FIG. 1. It is then expedient in this case to guide the pressure plate 42 by means of leaf springs since it is supposed to be moved further axially than lamella parts further away from the pressure plate 42.

Figure 4:
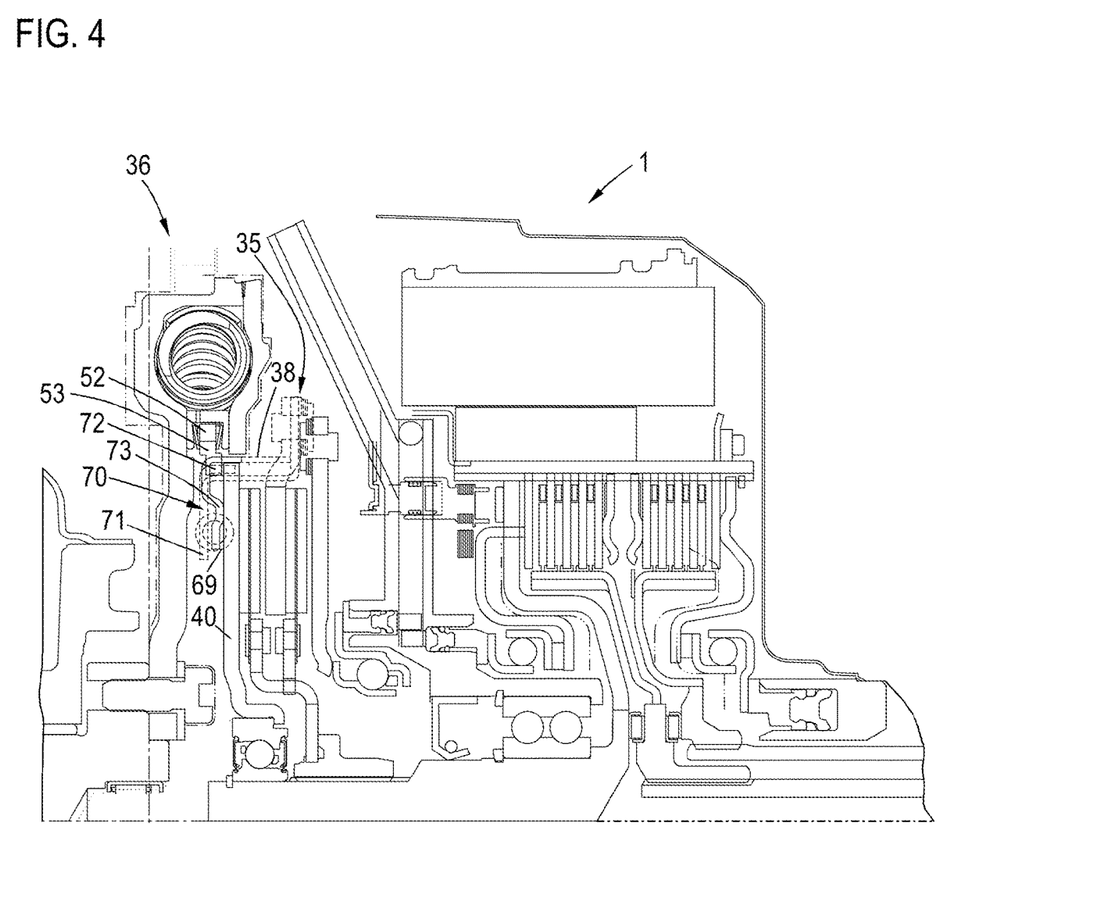

FIG. 4 shows an embodiment example of a separating clutch 35 which corresponds, as regards the fundamental construction of the separating clutch 35, to the embodiment example shown in FIG. 3. Here too, the counter-plate 40 is rigidly connected to the outer lamella carrier 38, while the intermediate plate 41 and the pressure plate 42 are guided on the outer lamella carrier 38 by means of toothing engagement in a manner which prevents relative rotation but allows axial movement. The outer lamella carrier 38 is coupled to the dual mass flywheel 36 by means of toothing engagement, for which purpose said flywheel has a radial flange 52 with internal toothing 53, which engages in the external toothing of the outer lamella carrier 38 in a torque-transmitting manner. In the embodiment shown in FIG. 4, provision is furthermore made for one or more spring elements 69 that preload the toothing engagement between the outer lamella carrier 38 and the dual mass flywheel 36 in the circumferential direction to be provided. These spring elements 69 serve to move or brace the dual mass flywheel 36 slightly relative to the outer lamella carrier 38 in the circumferential direction, thus ensuring that the flank of the internal toothing 53 always rests against the adjacent flanks of the outer toothing of the outer lamella carrier 38 in one circumferential direction. This serves to avoid unwanted rattling noises within the splined or toothed joint between the dual mass flywheel 36 and the separating clutch 35.

In the embodiment example shown in FIG. 4, a bracing element 70, shown here only in dashed lines, is provided, said element having a radially inward-extending radial flange 71, from which there projects a plurality of axially extending tabs 72, which engage between the interengaging toothing systems of the radial flange 52 and of the outer lamella carrier 38. The bracing element 70 is preferably embodied as an annular component, and therefore only one element has to be installed. Corresponding apertures or the like are provided on the radial flange 71, and therefore supporting sections are formed on the radial-flange side, on each of which a spring element 69, in this case too preferably a helical compression spring, is supported. The other end of the respective spring element 69 is supported on the radial flange 73 of the outer lamella carrier 38, via which this is connected to the counter-plate 40.

The spring element or elements 69 acts or act more or less tangentially, i.e. in the circumferential direction, and consequently rotates or rotate the outer lamellae carrier 38 relative to the radial flange 52. The teeth of the toothing 53 can thus be clamped between the tooth flanks of the external toothing of the outer lamella carrier 38, against which the toothing 53 comes to rest in one circumferential direction, and the tabs 72 of the bracing element 70, which press the toothing 53 against the abovementioned flanks of the external toothing of the outer lamella carrier 38. Consequently, by this means, continuous contact between two toothing flanks is ensured, thus enabling rattling to be excluded.

The teeth of the toothing 53 of the radial flange 52 are inserted between the mating contours of the external toothing of the outer lamella carrier 38 and of the tabs 72 of the bracing element 70 during the assembly of the internal combustion engine and the transmission.

In the case of the separating clutch 35 shown in FIG. 5, the assembly interface for the assembly of the internal combustion engine and the transmission is likewise situated between an outer lamella carrier 38, which is rigidly connected to the dual mass flywheel 36 and the shape of which corresponds to that described with reference to FIG. 2, and which can, if appropriate, be riveted in a fixed manner or welded in a fixed manner to the dual mass flywheel 36 or radial flange 52, and the other components of the separating clutch 35. In the embodiment example shown in FIG. 5, however, the counter-plate 40, the intermediate plate 41 and the pressure plate 42 do not engage in the internal toothing of the outer lamella carrier 38, said section once again being illustrated by the section 39 in dashed lines which indicates it; on the contrary, in this embodiment the two clutch disks 43, 44 are guided in an axially movable but torque-transmitting manner by their corresponding external toothing systems in the internal toothing of the outer lamella carrier 38.

Here, the counter-plate 40, the intermediate plate 41 and the pressure plate 42 are connected to the intermediate shaft 33 for conjoint rotation therewith. For this purpose, the counter-plate 40 has a flange 74, which extends radially toward the intermediate shaft 33 and adjoining which is an internally toothed hub 75, through which the externally toothed intermediate shaft 33 passes. An inner lamella carrier 76 is fixed on the counter-plate 40 or the flange 74, e.g. riveted or welded thereto by means of a radial flange with an L-shaped cross section, which has external toothing. Internal toothing systems formed on the intermediate plate 41 and the pressure plate 42 engage in this external toothing, with the result that these two plates 41, 42 are guided in an axially movable manner on the inner lamella carrier 76 but are equally connected to said carrier for conjoint rotation therewith. If the lamella pack is compressed, the torque can be transmitted to the intermediate shaft 33 via the counter-plate 40 and the hub 75.

This embodiment is therefore distinguished by the fact that the outer lamella carrier 38 is rigidly connected to the dual mass flywheel 36, wherein the clutch disks 43, 44 are guided in an axially movable manner on the outer lamella carrier 38. Furthermore, an inner lamella carrier 76 is provided, relative to which the pressure plate 42 and the intermediate plate 41 are axially movable and which is rigidly connected to the counter-plate 40, which, for its part, is rigidly connected to the intermediate shaft 33 for conjoint rotation therewith.

By means of this construction of the separating clutch 35, the counter-plate 40 can be rigidly connected to the intermediate shaft 33, as described. A bearing 54, as provided in the previous embodiment examples, is no longer required here since not only the actuating forces but also the torque transmitted by the separating clutch can now be introduced into the intermediate shaft 33 via the counter-plate 40. Since this construction of the separating clutch does not support its actuating forces on the crankshaft and nevertheless does not require a bearing 54 for support, this construction provides an advantage in terms of installation space and costs.

The separating clutch 35 with the internally toothed hub 75 belonging to the counter-plate 40 is pushed onto the externally toothed intermediate shaft 33 and secured against unwanted axial displacement by a retaining ring 77. As described, the counter-plate 40, the intermediate plate 41 and the pressure plate 42 are connected to one another by the inner lamella carrier 76, which is rigidly connected to the counter-plate 40, e.g. by welding or riveting, and which engages in internal toothing on the inside diameter of the intermediate plate 41 and thereby positions the intermediate plate 41, guides it axially and couples it to the counter-plate 40 for conjoint rotation therewith. At the opposite end of the inner lamella carrier 76 from the counter-plate 40, said carrier is connected to the pressure plate 42, which, just like the intermediate plate 41, it positions, guides axially and couples to the counter-plate 40 for conjoint rotation therewith.

The pressure plate 42 comprises a radially outer part or section, the actual pressure part, and a radially inner flange part 78, wherein the two parts are connected radially to one another by a number of webs distributed around the circumference. By this means, therefore, a plurality of apertures delimited by means of the webs in the circumferential direction are formed in the pressure plate 42. The radially outer part of the pressure plate 42 forms the friction surface for the adjacent clutch disk 44 and is similar to the intermediate plate 41. The radially outer part of the pressure plate 40 has a toothed contour on its inside diameter to enable it to engage in the inner lamella carrier 76. This toothed contour is interrupted multiple times at the circumference by the radially inward-extending webs and apertures described.

The radially inner part of the pressure plate 42 is shaped as a pressure piece, which connects the pressure plate 42 to the support bearing 48 of the actuating system 49. In order to ensure sufficiently high rigidity, the radially inner part of the pressure plate 42 is embodied as a region that is continuous at the circumference and which, if at all, is penetrated only by small ventilation openings that have only a slight effect on rigidity.

To ensure that the webs which connect the radially outer part and the radially inner part of the pressure plate 42 to one another and delimit the apertures do not strike the inner lamella carrier 76, the inner lamella carrier has gaps at the points at which the webs are located. This means that axially extending fingers, which extend through the apertures in the pressure plate 42, are formed on the inner lamella carrier 76. Here, the webs are inserted into the slots between the fingers. The webs can move back and forth axially within the slots when the pressure plate 42 is moved axially by the actuating system 49. The slots of the inner lamella carrier 76 extend axially into the inner lamella carrier 76 only to a depth required by the range of movement of the pressure plate 42. The rest of the inner lamella carrier 76 is continuous all the way round in order to achieve adequate rigidity. If required for ventilation and permitted by the rigidity of the inner lamella carrier 76, there can also be small isolated ventilation openings in this region.

It is conceivable for the webs distributed on the circumference, between the radially outer and the radially inner part of the pressure part 42, to be guided axially in the slots of the inner lamella carrier 76. In this case, the width of the fingers of the inner lamella carrier 76 and the width of the apertures should be matched to one another in such a way that the pressure plate 42 can be guided axially on the inner lamella carrier 76 and can be connected to the latter for conjoint rotation therewith. If, therefore, the positioning of the pressure plate 42, the axial guidance and the torque transmission is accomplished through the contact between the webs and the fingers or slots, the inner lamella carrier 76 no longer needs to form a toothed contour in the region of the pressure plate 42, and the radially outer part of the pressure plate 42 also no longer needs to be provided with internal toothing.

Figure 5:
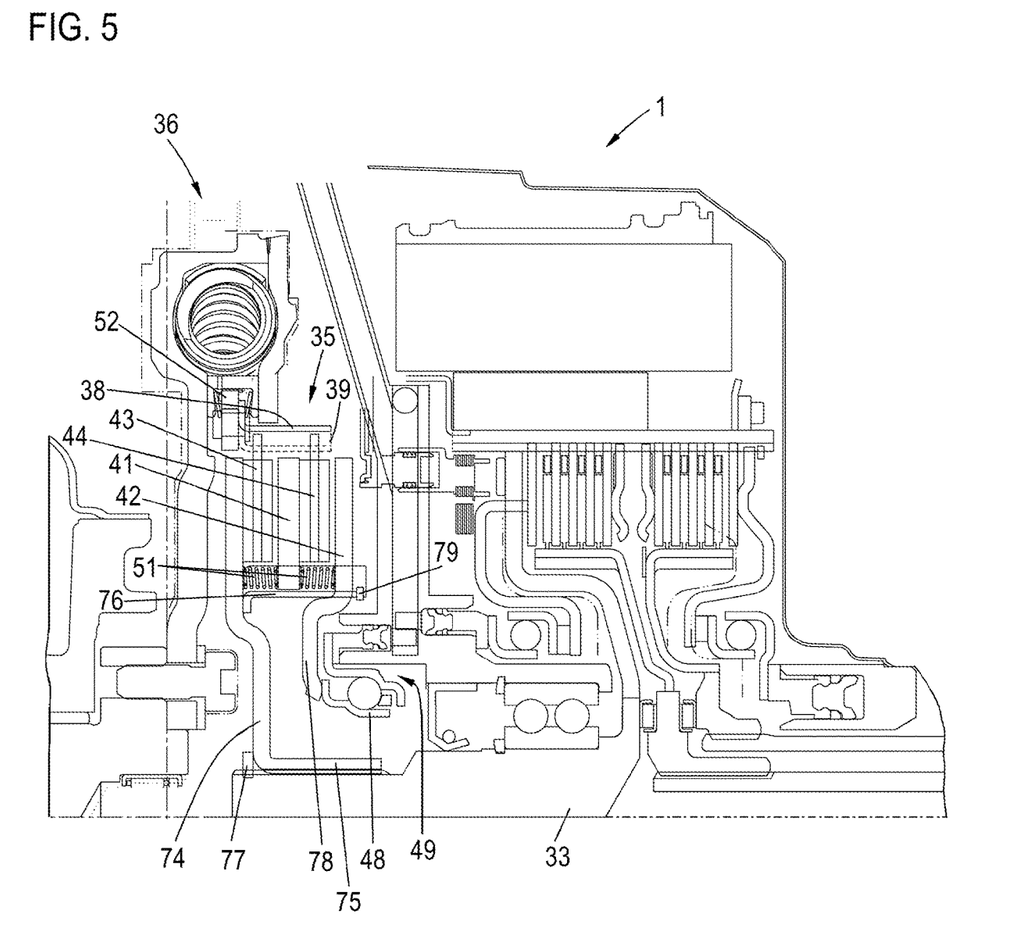

In the case of the separating clutch 35 shown in FIG. 5 too, opening can be assisted by spring elements 51 between the counter-plate 40 and the intermediate plate 41 and between the intermediate plate 41 and the pressure plate 42. Of course, it is also possible to arrange spring elements between the counter-plate 40 and the pressure plate 42. As an alternative, the principle shown in FIG. 3 of fixing the intermediate plate 41 and/or the pressure plate 42 in an axially movable and torque-transmitting manner by means of leaf springs can also be applied mutatis mutandis to the separating clutch 35 shown in FIG. 5. The leaf springs are then not arranged radially outside the clutch disks 43, 44 but radially within the clutch disk inside diameter.

In order to facilitate the mounting of the internal combustion engine on the transmission in the case of the separating clutch 35 shown in FIG. 5 too, the two clutch disks 43, 44 can be secured against rotation relative to one another by an alignment element, as described with reference to FIG. 2. As a result, the tooth gaps of the two clutch disks 43, 44 are in alignment during the assembly of the internal combustion engine and the transmission, thus enabling the toothing of the lamella carrier 38 fixed on the radial flange 52 of the dual mass flywheel 36 to be inserted easily into the tooth gaps of the clutch disks 43, 44. The details of the alignment element 60 in the embodiment example shown in FIG. 2 which have been described can also be applied with the necessary changes to the alignment element which aligns the two clutch disks 43, 44. Instead of one or more separate parts which form the alignment element, the tabs that serve to align the two disks can also be formed on the clutch disk components that are present in any case, e.g. the lining spring segments. In the case of the separating clutch 35 shown in FIG. 5, the alignment element that is to be provided if appropriate has to align only the clutch disk toothing systems. It is not necessary to group the separating clutch components into a subassembly secure against loss for transportation and for the assembly process.

In the case of the separating clutch shown in FIG. 5, this securing for assembly can be achieved via the inner lamella carrier 36, which holds the separating clutch components together by preventing the pressure plate 42 accidentally sliding off the inner lamella carrier 76. For this purpose, either the edge of the inner lamella carrier 76 can be bent over behind the pressure plate 42, then engaging behind the latter (as shown in principle in FIG. 1), or a retaining ring 79, as shown in FIG. 5, is provided behind the pressure plate 42, being inserted into a corresponding annular groove in the inner lamella carrier 76.

When the outer lamella carrier 38 fixed on the dual mass flywheel 36 is inserted into the external toothing systems provided radially on the outside of the clutch disks 43, 44 during the mounting of the internal combustion engine on the transmission, large axial forces can act on the radially outer regions of the clutch disks 43, 44 during the mounting process. These forces can be reduced by the alignment elements described, which ensure that the tooth gaps of the clutch disks 43, 44 are in alignment. In addition or as an alternative, oblique surfaces can be provided next to the tooth gaps, said surfaces allowing the teeth of the internal toothing of the outer lamella carrier 38 to slide more easily into the tooth gaps of the clutch disks 43, 44, as already described above with reference to FIG. 2. These oblique surfaces can be provided at the end of the outer lamella carrier 38 which faces away from the dual mass flywheel 36 and/or on the sides of the clutch disks 43, 44 which face the dual mass flywheel. It is nevertheless expedient to make the radially outer part of the clutch disks 43, 44 robust to ensure that these regions can bear axial forces that go significantly beyond the axial forces to be expected in subsequent clutch operation.

In the embodiment example shown in FIG. 5, the central region of the clutch disks 43, 44, which forms the connecting contour with the outer lamella carrier 38 radially on the outside, already accounts for more than 25% of the total distance between the two disk friction surfaces situated on the two opposite sides of the clutch disks 43, 44. Thus, the central region of the clutch disks 43, 44 accounts for a greater proportion of the unclamped total width of the clutch disks 43, 44 than the lining spring segments and the carrier plates of commercially available clutch disks, for example. For the separating clutch 35 shown here, it is advisable to give the axially narrowest circumferentially extending region of the respective clutch disk 43, 44, which is situated radially between the outside diameter of the friction surfaces and the inside diameter of the connecting contour (toothing contour), an axial width such that it accounts for 20%-100% of the total distance between the two disk friction surfaces situated on the two opposite sides of the unclamped clutch disk 43, 44. That region of the connecting contour (toothing contour) which is at some distance radially from the friction surfaces can even be made somewhat wider. For this separating clutch and for the other lamella or multi-disk clutches shown here, it is advisable to give the region of the connecting or toothing contour by means of which the clutch disks are in operative connection with a lamella carrier a width such that it accounts for 50%-200% of the total distance between the two disk friction surfaces situated on the two opposite sides of the unclamped clutch disk. If the clutch components connected to the dual mass flywheel 36 for conjoint rotation therewith are not to be embodied as clutch disks but as lamellae of some other kind, the measures described here in relation to the clutch disks apply equally.

Figure 6:
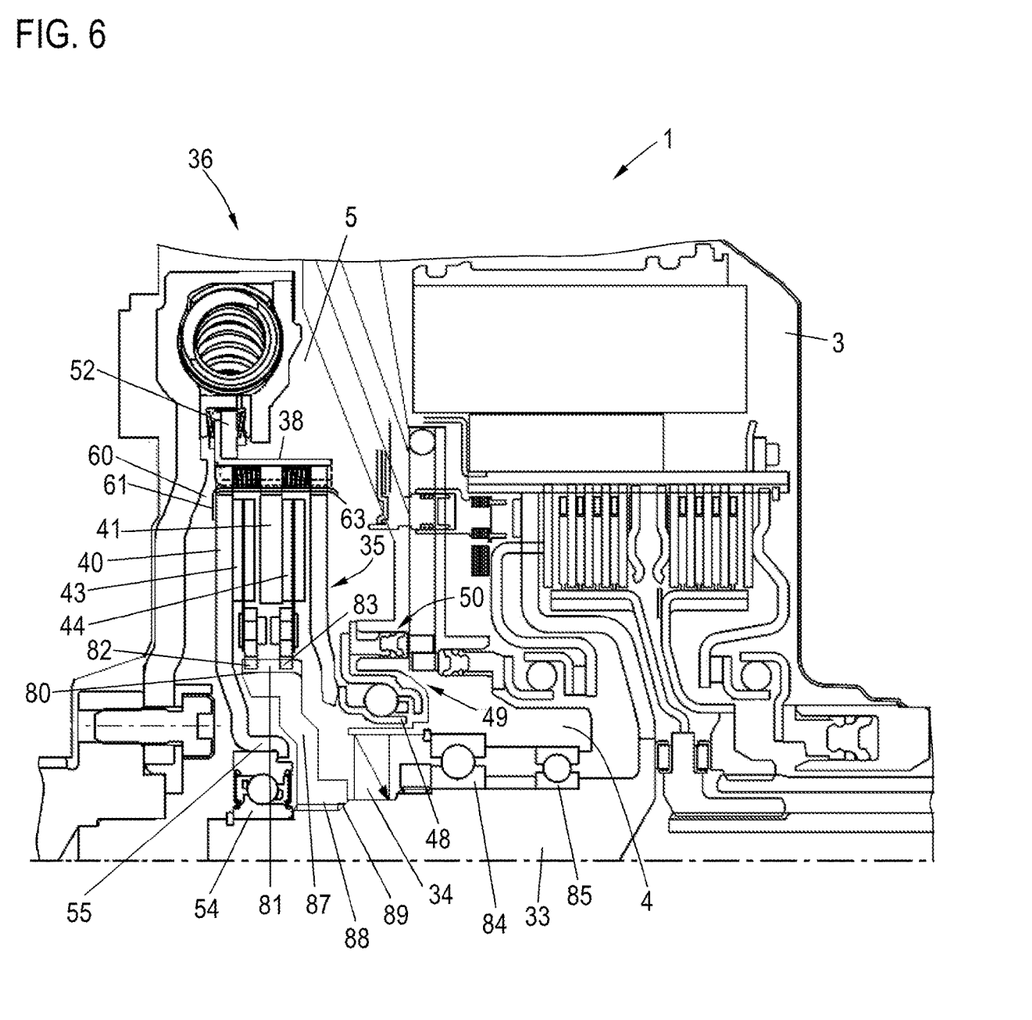

FIG. 6 shows another embodiment example of a hybrid module, wherein the fundamental construction of the separating clutch is similar to that in FIG. 2. That is to say that, here too, the outer lamella carrier 38 is once again rigidly connected to a radial flange 52 of the dual mass flywheel 36 by means of riveted or welded joints. Here too, the assembly interface is once again provided between the outer lamella carrier 38 and the component elements of the separating clutch 35 which are coupled releasably to said carrier and are fixed against relative rotation but axially movable by means of respective toothing engagements, that is to say in this case the counter-plate 40, the intermediate plate 41 and the pressure plate 42.

Here too, the counter-plate 40 is once again rotatably mounted on the intermediate shaft 33 by means of an extended flange section, in which a bearing seat 55 is formed, and by means of a bearing 54. The pressure plate 42, for its part, is once again connected to the bearing 48 and supported on the latter by means of an extended flange section, the bearing, for its part, as part of the actuating system 49, being axially actuable by means of the piston-cylinder unit 50.

Here, however, the attachment of the two clutch disks 43, 44 to the intermediate shaft 33 is different from the embodiment described in FIG. 2, for example. Instead of extending one of the clutch disks radially inward and connecting it directly to the intermediate shaft, as provided in FIG. 2, the two clutch disks 43, 44 are connected to the intermediate shaft 33 by a common inner lamella carrier 80 according to FIG. 6. The inner lamella carrier 80 has external toothing 81, in which the clutch disks 43, 44 engage by means of corresponding internal toothing systems 82, 83. Accordingly, the clutch disks 43, 44 are guided in an axially movable manner on the inner lamella carrier 80 but are connected to the inner lamella carrier 80 for conjoint rotation therewith and thus in a torque-transmitting manner. The inner lamella carrier 80 can thus be connected rigidly, that is to say in an axially fixed location and for conjoint rotation to the intermediate shaft 33, and is therefore itself not axially movable, in contrast to the above embodiment examples shown in FIGS. 1-4, since the axial movement takes place in the region of the toothing engagement on the inner lamella carrier 80 with the clutch disks 43, 44. Such a connection of the inner lamella carrier 80 to the intermediate shaft 33, in which no sliding movements occur, can be made significantly smaller than in the example shown in FIG. 2, for example. The axial installation space gained in this way has been used in the hybrid module 1 shown in FIG. 6 to shift the sealing element 34 which separates the wet space 3 from the dry space 5 axially in the direction of the separating clutch 35. As a result, there is more axial space for the mounting of the intermediate shaft 33 on the supporting wall 4. FIG. 6 shows a bearing assembly having two separate bearings 84, 85, for example, instead of the single two-row bearing 86, as shown in the previous embodiment examples.

For connection to the intermediate shaft 33, the inner lamella carrier 80 has a radially inward-extending flange 87 and an internally toothed hub 88 adjoining said flange, which engages in external toothing on the intermediate shaft 33. In one axial direction, the inner lamella carrier 80 is supported on a stop 89 in the form of an annular collar on the intermediate shaft 33 and, on the other side, support is provided by means of the bearing 54 or the inner ring thereof, which is fixed axially in position.

Axially adjoining the hub 88 is the sealing element 34, which, in the embodiment example shown, is positioned within the support ring 48, by means of which the pressure plate 42 is supported axially.

In the example shown, an alignment element 60 is likewise provided, which aligns external toothing systems formed on the pressure plate 42, the intermediate plate 41 and the counter-plate 40, said toothing systems engaging in the axially extending internal toothing of the outer lamella carrier 38. Here too, the alignment element 60 has corresponding surrounding sections on both sides in the form of the radial flange 61 and of the bent-over end 63, which engage behind or over the counter-plate 40 and the pressure plate 42, thereby providing axial retention. As regards further details, attention is drawn to the detailed description of the alignment element 60 shown in FIG. 2.

In conclusion, it should be noted that all the features described for the various embodiments and embodiment examples can be combined with one another in any desired manner. Details of one embodiment example in one figure can be transferred without modification or with appropriate modification also to the other embodiment examples shown in the other figures.

The direction indicators "axial", "radial", "tangential" and "in the circumferential direction" refer to the axis of rotation about which the respective clutch, the clutch components, such as disks or plates, or the rotor of the electric machine rotate. Thus, the axial direction is orthogonal to the friction surfaces of the friction partners of the respective clutches.

Although the present disclosure has been described above with reference to embodiment examples, it is self-evident that various embodiments and modifications can be implemented without exceeding the scope of the present disclosure as defined in the appended claims.

REFERENCE NUMERALS

1 hybrid module
2 housing
3 wet space
4 partition wall
5 dry space
6 electric machine
7 stator
8 rotor
9 clutch device
10 sub-clutch
11 sub-clutch
12 outer lamella carrier
13 lamella
14 lamella
15 lamella
16 lamella
17 inner lamella carrier
18 inner lamella carrier
19 hub
20 output shaft
21 hub
22 output shaft
23 actuating system
24 actuating system
25 pressure pot
26 pressure pot
27 bearing
28 bearing
29 piston-cylinder arrangement
30 piston-cylinder arrangement
31 abutment
32 abutment
33 intermediate shaft
34 sealing element
35 separating clutch
36 dual mass flywheel
37 coupling shaft flange
38 outer lamella carrier
39 section
40 counter-plate
41 intermediate plate
42 pressure plate
43 clutch disk
44 clutch disk
45 hub
46 connecting flange
47 driver disk
48 bearing
49 actuating system
50 piston-cylinder unit
51 spring element
52 radial flange
53 internal toothing
54 bearing
55 bearing seat
56 shaft retention ring
57 flange
58 arc spring channel
59 arc spring 60 alignment element
61 radial flange
62 extension
63 edge
64 leaf spring
65 leaf spring
66 radial flange
67 extension
68 extension
69 spring element
70 bracing element
71 radial flange
72 tab
73 radial flange
74 flange
75 hub
76 inner lamella carrier
77 retaining ring
78 flange part
79 retaining ring
80 inner lamella carrier
81 external toothing
82 internal toothing
83 internal toothing
84 bearing
85 bearing
86 bearing
87 flange
88 hub
89 stop

The invention claimed is:

1. A hybrid module for a powertrain of a motor vehicle, comprising:
an electric machine;
a clutch device; and
a frictionally-engaging separating clutch arranged between a dual-mass flywheel and an intermediate shaft, comprising:
a counter-plate;
an outer lamella carrier rigidly connected to the counter-plate;
a pressure plate, axially movable relative to the outer lamella carrier;
an intermediate plate, axially movable relative to the outer lamella carrier;
a first clutch disk, axially movable and extending between the pressure plate and the intermediate plate; and
a second clutch disk, axially movable and extending between the counter-plate and the intermediate plate, wherein:
a one of the pressure plate or the intermediate plate is connected to the outer lamella carrier for conjoint rotation therewith via a leaf spring; or
a one of the pressure plate or the intermediate plate is connected to the counter-plate for conjoint rotation therewith via the leaf spring, wherein:
the outer lamella carrier comprises an internal toothing; and
the other of the pressure plate or the intermediate plate comprises an external toothing engaged with the internal toothing in a manner which prevents relative rotation but allows axial movement.

2. The hybrid module of claim 1, wherein:
the intermediate plate is connected to the outer lamella carrier via the leaf spring; and
the pressure plate comprises the external toothing engaged with the internal toothing.

3. The hybrid module of claim 1 wherein the one of the pressure plate or the intermediate plate is connected to the counter-plate for conjoint rotation therewith via the leaf spring.

4. The hybrid module of claim 3, wherein:
the counter-plate comprises an outward-extending radial flange or an outward-extending tab; and
the leaf spring is fixed to the outward-extending radial flange or to the outward-extending tab.

5. The hybrid module of claim 4, wherein:
the pressure plate or the intermediate plate comprises radially outward-extending web-type extensions; and
the leaf spring is fixed to the radially outward-extending web-type extensions.

6. The hybrid module of claim 5, wherein:
the outer lamella carrier comprises axially extending apertures; and
the intermediate plate comprises the radially outward-extending web-type extensions; and
the radially outward-extending web-type extensions are engaged with the axially extending apertures.

7. The hybrid module of claim 1, wherein:
the intermediate plate is connected to the outer lamella carrier via the leaf spring; and
the pressure plate comprises the external toothing engaged with the internal toothing.

8. The hybrid module of claim 1, further comprising the dual-mass flywheel, wherein the outer lamella carrier is coupled to the dual-mass flywheel by toothing engagement.

9. The hybrid module of claim 8, wherein:
the outer lamella carrier comprises a dual-mass flywheel external toothing;
the dual-mass flywheel comprises a radially inward-extending flange;
the radially inward-extending flange comprises a dual-mass flywheel internal toothing; and
the dual-mass flywheel internal toothing is engaged with the dual-mass flywheel external toothing.

10. A hybrid module for a powertrain of a motor vehicle, comprising:
an electric machine;
a clutch device; and
a frictionally-engaging separating clutch arranged between a dual-mass flywheel and an intermediate shaft, comprising:
a counter-plate;
an outer lamella carrier rigidly connected to the counter-plate;
a pressure plate, axially movable relative to the outer lamella carrier;
an intermediate plate, axially movable relative to the outer lamella carrier;
a first clutch disk, axially movable and extending between the pressure plate and the intermediate plate; and
a second clutch disk, axially movable and extending between the counter-plate and the intermediate plate, wherein:
the pressure plate or the intermediate plate is connected to the outer lamella carrier for conjoint rotation therewith via a leaf spring;

the outer lamella carrier comprises an outward-extending radial flange or an outward-extending tab; and the leaf spring is fixed to the outward-extending radial flange or to the outward-extending tab.

11. The hybrid module of claim 10, wherein the pressure plate and the intermediate plate are both connected to the outer lamella carrier via the leaf spring.

12. The hybrid module of claim 10, wherein:

the one of the pressure plate or the intermediate plate comprises radially outward-extending web-type extensions; and the leaf spring is fixed to the radially outward-extending web-type extensions.

13. The hybrid module of claim 12, wherein:

the outer lamella carrier comprises axially extending apertures; and the intermediate plate comprises the radially outward-extending web-type extensions; and the radially outward-extending web-type extensions are engaged with the axially extending apertures.

14. A hybrid module for a powertrain of a motor vehicle, comprising:

an electric machine;

a clutch device; and a frictionally-engaging separating clutch arranged between a dual-mass flywheel and an intermediate shaft, comprising:

a counter-plate;

an outer lamella carrier rigidly connected to the counter-plate;

a pressure plate, axially movable relative to the outer lamella carrier;

an intermediate plate, axially movable relative to the outer lamella carrier;

a first clutch disk, axially movable and extending between the pressure plate and the intermediate plate; and a second clutch disk, axially movable and extending between the counter-plate and the intermediate plate, wherein the pressure plate and the intermediate plate are both connected to the counter-plate via a leaf spring.

* * * * *